United States Patent
Hayashi

(10) Patent No.: US 8,189,500 B2
(45) Date of Patent: May 29, 2012

(54) COMMUNICATION TERMINAL AND COMMUNICATION SYSTEM

(75) Inventor: Tsutomu Hayashi, Kariya (JP)

(73) Assignee: Denso Corporation, Kariya (JP)

( * ) Notice: Subject to any disclaimer, the term of this patent is extended or adjusted under 35 U.S.C. 154(b) by 279 days.

(21) Appl. No.: 12/655,640

(22) Filed: Jan. 5, 2010

(65) Prior Publication Data

US 2010/0172312 A1    Jul. 8, 2010

(30) Foreign Application Priority Data

Jan. 7, 2009   (JP) ................. 2009-002030

(51) Int. Cl.
  *H04B 7/00*    (2006.01)
  *H04B 1/18*    (2006.01)
  *H04W 4/00*    (2009.01)
(52) U.S. Cl. ............. 370/310; 370/328; 455/179.1
(58) Field of Classification Search .......... None
  See application file for complete search history.

(56) References Cited

U.S. PATENT DOCUMENTS

| | | | |
|---|---|---|---|
| 5,912,918 A * | 6/1999 | Bauchot et al. | 375/133 |
| 7,120,417 B2 * | 10/2006 | Shoki et al. | 455/403 |
| 7,480,507 B2 | 1/2009 | Kuroda | |
| 2002/0193112 A1 * | 12/2002 | Aoki et al. | 455/437 |
| 2005/0107109 A1 | 5/2005 | Gunaratnam et al. | |
| 2009/0036098 A1 * | 2/2009 | Lee et al. | 455/411 |

FOREIGN PATENT DOCUMENTS

| | | |
|---|---|---|
| JP | 10-108261 | 4/1998 |
| JP | 2006-020256 | 1/2006 |
| JP | 2006-217525 | 8/2006 |
| JP | 2008-141259 | 6/2008 |

* cited by examiner

*Primary Examiner* — Anh-Vu H Ly
*Assistant Examiner* — Cassandra Decker
(74) *Attorney, Agent, or Firm* — Harness, Dickey & Pierce, PLC

(57) ABSTRACT

A communication terminal having a control unit performs a station search for determining that a not-yet-connected station is included in connectable stations, and performs a trial connection to the not-yet-connected station for determining whether the not-yet-connected station is capable of accommodating packet data communication. The determination results of the trial connection for the packet data communication, or packetability, are stored in a memory in the control unit in association with a station ID of the not-yet-connected station. The stored packetability of the not-yet-connected station is used for notifying a user, from a presentation unit of the communication terminal, of the availability of the packet data communication for the improved usability of the packet data communication.

10 Claims, 3 Drawing Sheets

COMMUNICATION TERMINAL AND COMMUNICATION SYSTEM

CROSS REFERENCE TO RELATED APPLICATION

The present application is based on and claims the benefit of priority of Japanese Patent Application No. 2009-2030, filed on Jan. 7, 2009, the disclosure of which is incorporated herein by reference.

FIELD OF THE INVENTION

The present disclosure generally relates to a communication terminal that performs packet data communication with a base station through a mobile communication network as well as a communication system organized by the above communication terminals.

BACKGROUND INFORMATION

Conventionally, various techniques are known for the communication between a terminal and a base station for networking those terminals and stations. For example, cellular phone services provide voice call services and packet data communication services through cellular phone networks for cellular phone terminals. In this case, for notifying the user about the availability of the call service at the moment, the cellular phone displays an in-area icon and an out of service area icon based on the signal intensity or Ec/Io (i.e., a ratio of received pilot energy (Ec) to total received energy or the total power spectral density (Io)). For example, a Japanese patent document JP-A-H10-108261 discloses the determination method of the in-area and out of service area of the service based on the received electrical field intensity and errors in the modulated digital signal that is derived from the received radio wave.

Further, in the telematics services, map data and POI (i.e., Point Of Interest) data are downloaded and diagnosis information is uploaded from and to a data center by a vehicular communication module through the cellular phone network, for example. Furthermore, if the voice call service for voice call to a service center is not desired, only packet data communication service can be purchased at a lower service rate for the data upload and download.

The network operators of the cellular phone networks basically build their own networks by themselves, by providing base stations for themselves, for the purpose of accommodating subscribed users by allowing them to access their own base stations for the mobile communication services. However, it is impossible for each of the network operators to cover all of the service areas only by their own base stations. Therefore, the network operators share their base stations with other operators, through roaming contracts, for the purpose of providing the subscribed users with the extended service through the other operator's networks and stations for the increased coverage.

In that case, even when roaming of the voice call is guaranteed through base stations and networks of different operators, roaming of the packet data communication may not necessarily be guaranteed for the roaming user.

For example, in the cellular phone services, the access to a certain base station is determined based on the signal intensity and/or Ec/Io measurement results, as described above, with the display of the in-area/out of service area icons. That is, the in-area/out of service area icons on the cellular phone are displayed for notifying the user of the availability of the voice call only, because the telephone network has primarily been built up for the call switching of the voice call.

However, the packet data communication through the cellular phone network is an extension of the voice call system to a data communication system, thereby suffering from various limitations of the voice call system. That is, for example, even when the signal intensity is strong enough, the packet data communication may not be available for various reasons such as: (a) the base station does not support the packet data communication function, (b) the packet data communication function in a specific base station is temporarily not working due to some failure, (c) the roaming partner's network does not support the packet data communication function, (d) the roaming partner's network does not support roaming of the packet data communication function, and the like.

Therefore, the in-area/out of service area icons on the cellular phone do not correctly notify the user of the availability of the packet data communication from the "available" base stations in the connectable range, thereby causing the inconveniences for the user of the packet data communication.

SUMMARY OF THE INVENTION

In view of the above and other problems, the present disclosure provides a communication terminal and a communication system having an improved quality of services for the user of the network.

In an aspect of the present disclosure, a communication terminal for packet data communication with a station that is connected to a communication network includes: a search unit for searching for connectable stations; a history check unit for examining if the searched stations searched by the search unit have been previously connected to; a trial unit for trying the packet data communication with the searched stations when not-yet-connected stations are determined to be included in the searched stations by the history check unit; a relation storage unit for storing relation information between a trail result by the trial unit indicative of whether or not the packet data communication to a tried station is successful and a station ID of the tried station; a packetability check unit for examining if a packetable station is included in the searched stations based on the relation information stored in the relation storage unit; and a presentation unit for presenting information regarding the packet data communication based on packetability check results by the packetability check unit. In the above context, "packetable" and "packetability" stand for a condition that the packet data communication can actually be performed.

According to the above operation scheme of the communication terminal, for the connectable stations that have not yet been connected previously, actual packet data communication is tried for recording the trial results in association with the station ID of the tried station, the "packetable" stations can be accurately determined based on those records. Further, the trial results are utilized for the presentation of the packetability of the base stations for the user, thereby enabling the user to always recognize the "correct" packetability for the improved usability of the communication network.

Further, when the above communication terminals are organized as a communication system, the packetability information from other communication terminals can be collected and shared with all communication terminals in the system on the network, thereby providing the improved usability of the packet data communication for the communication terminals in the communication system.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
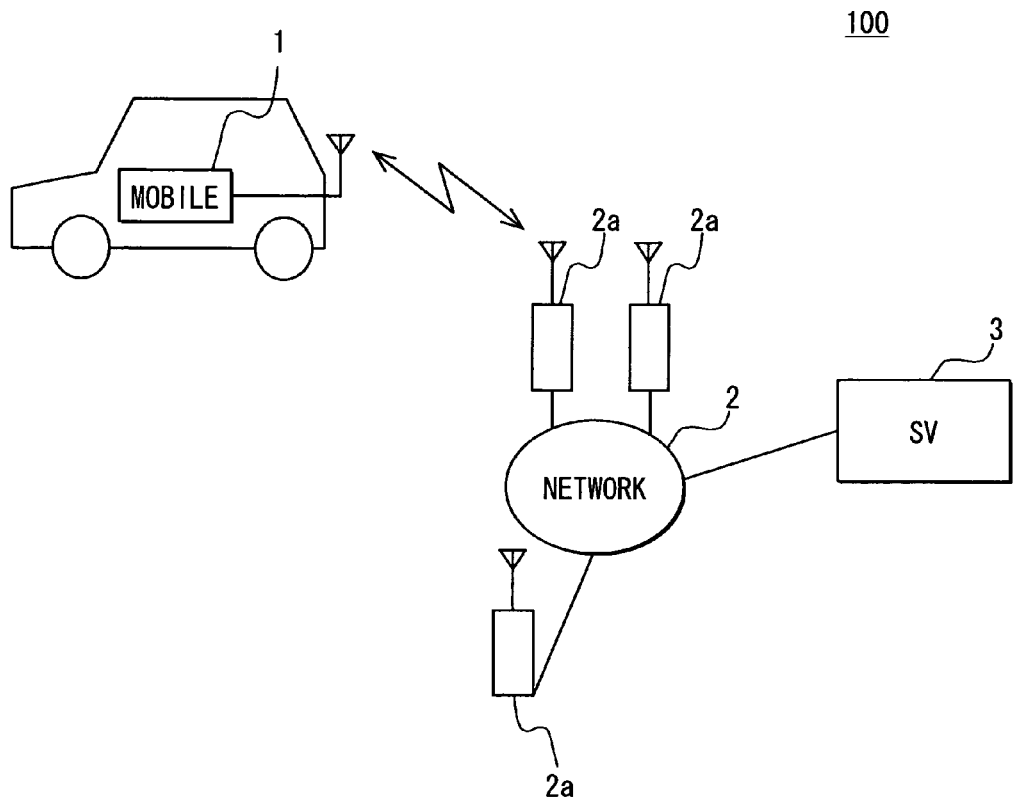
FIG. 1 is a block diagram of a communication system in an embodiment of the present disclosure.

An embodiment of the present invention is explained with reference to the drawing. FIG. 1 is a block diagram showing schematic configuration of a communication system 100 in an embodiment of the present invention. The communication system 100 shown in FIG. 1 includes a mobile station 1, a mobile telephone network 2, a base station 2a and a center server 3.

The mobile station 1 is a communication device for mobile communication. For example, a cellular phone like terminal carried by a vehicle or a user for communication through the mobile telephone network 2 for data exchange with the center server 3 may serve as the mobile station 1. In the present embodiment, the mobile station 1 is assumed to be a data communication module (DCM) carried by a vehicle. In addition, the DCM is an in-vehicle communication module used for telematics communication. In addition, a vehicle carrying the mobile station 1 is called an own vehicle in the following description.

The mobile telephone network 2 is a communications network that enables mutual communication between the mobile station 1 and the center server 3. In this case, a well-known cellular phone network may serve as the mobile telephone network 2. In addition, the mobile telephone network 2 is connected to the Internet through a computer that is under control of the operator company of the mobile telephone network 2. That is, the mobile station 1 may be connected to the Internet.

The base station 2a is the device which can communicate with the mobile station 1 directly, and one or more stations 2a are connected to the end of the mobile telephone network 2. In addition, the base station 2a is a fixed device, and is installed on the roof of a telephone pole and a building, or on the ceiling of a telephone booth and a subway station.

In addition, though the configuration in FIG. 1 shows that three base stations 2a are connected to the mobile telephone network 2, the number of the base stations 2a may be more than four, or fewer than 2.

The center server 3 collects data uploaded from the mobile station 1 through the mobile telephone network 2, and provides data for downloaded to the mobile station 1 through the mobile telephone network 2. In this case, the server of the service center in a well-known telematics service may serve as the center server 3, for example. Further, map data for data update of the in-vehicle navigation system and/or a point of interest (POI) data may be downloaded from the center server 3 to the mobile station 1, for example.

Figure 2:
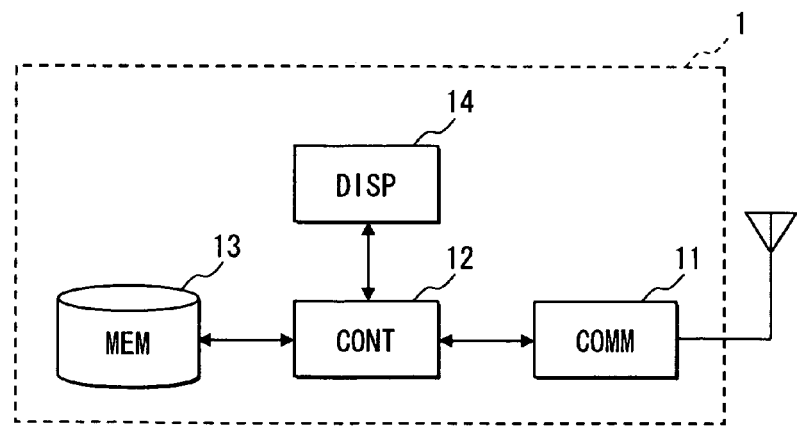
FIG. 2 is a block diagram of a communication terminal in the embodiment of the present disclosure.

FIG. 2 is used to describe a schematic configuration of the mobile station 1. FIG. 2 is a block diagram showing schematic configuration of the mobile station 1. The mobile station 1 includes a communication unit 11, a control unit 12, a memory 13 and a presentation unit 14 (denoted as "DISP" in the drawing) as shown in FIG. 2.

The communication unit 11 performs communication with the base station 2a connected to the mobile telephone network 2 by wireless communication through the communication antenna. Specifically, the communication unit 11 transmits and receives the communication signal of data in the packet data communications and the communication signal of the sound in the voice call.

The control unit 12 includes, as a main component, a microcomputer having a CPU, a ROM, a RAM, a backup RAM, an I/O and the like (not illustrated), and the control unit 12 carries out various processes by executing various control programs memorized by the ROM. The control unit 12 carries out various processes performed in a general DCM. In addition, the control unit 12 carries out a packet connection determination process (i.e., "packetability" check for determining whether a packet communication is connectable) and a base station selection process. Details of these processes are described later.

The memory 13 consists of an EEPROM (i.e., an electronically erasable and programmable read only memory) which can renew its contents electrically, and various information is memorized in the memory 13. In addition, the memory 13 stores a relation table that associates (a) information on whether a trial packet connection is successful or not with (b) a station ID of the base station 2a to which the trial packet connection is performed.

The presentation unit 14 consists of a display unit for image display and speakers or the like for sound output, and the image is displayed under the instructions of the control unit 12, and the sound is output under the instructions of the control unit 12. In addition, the display unit and the speakers in the presentation unit 14 may be used in a sharing manner with other vehicular apparatuses such as an in-vehicle navigation system and the like.

In addition, in the present embodiment, the mobile station 1 is equipped with the presentation unit 14. However, if an equivalent of the presentation unit 14 is provided in the vehicle as the display/speaker of other vehicular device, the mobile station 1 being configured not to include the presentation unit 14 may be possible.

Figure 3:
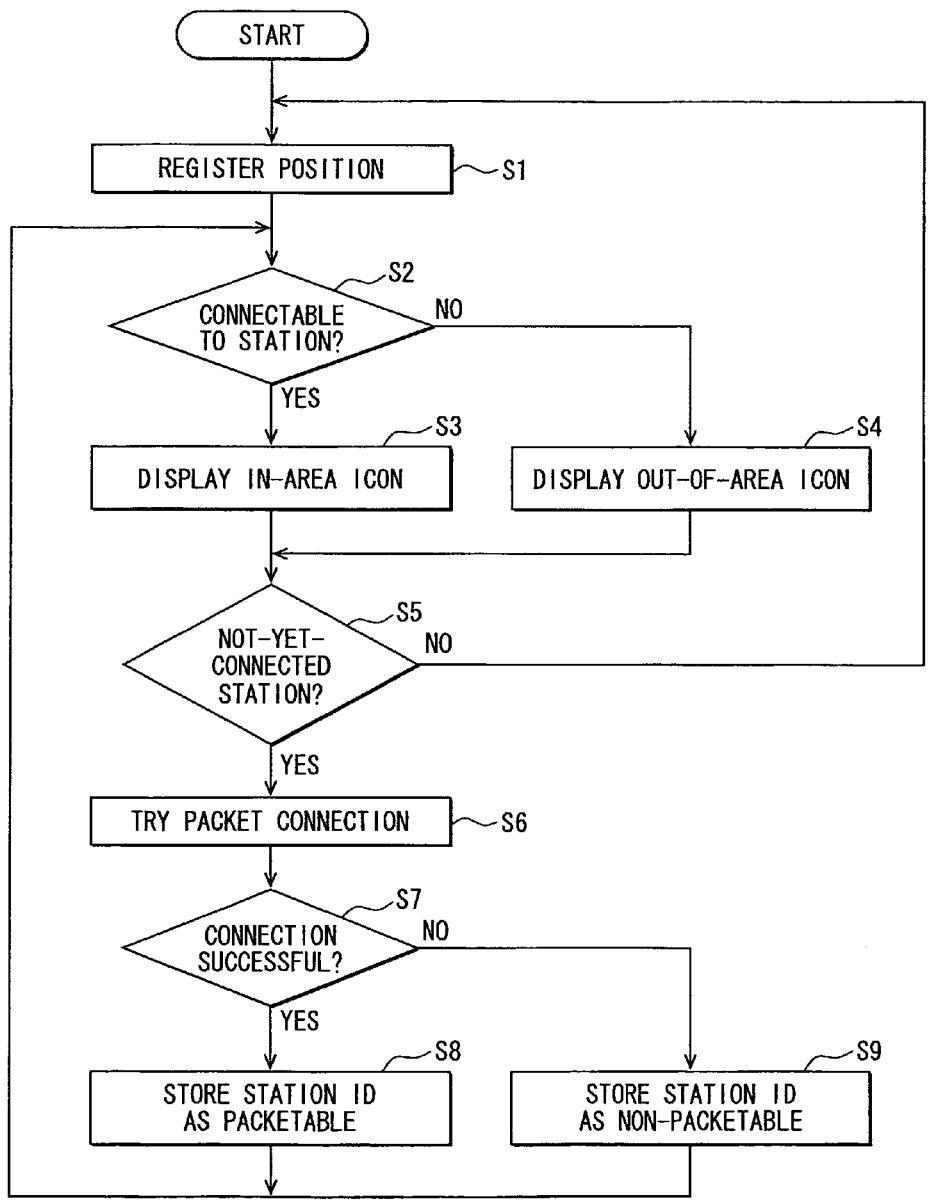
FIG. 3 is a flowchart of a packet connection determination process in a control unit of the communication terminal in the embodiment the present disclosure.

FIG. 3 is used to describe the packet connection determination process by the control unit 12. FIG. 3 is a flowchart showing a flow of the packet connection determination process. When the ignition switch of the own vehicle is turned on to start a power supply for the mobile station 1, the flow of the process is started.

First, in step S1, position registration is performed, to proceed to step S2. That is, in the process of position registration, it is determined, by performing a search, whether there is a connectable base station 2a among nearby base stations 2a around the mobile station 1. In this case, station search may be performed by a well-known conventional method. Then, based on the search results, the base station 2a having the highest signal intensity (i.e., electrical field intensity) and preferable Ec/Io is determined, and is contacted by using the communication unit 11 for communication area information. The process in S1 is an equivalent of "a search unit" in the claim language.

In step S2, whether there is a base station 2a that accommodates packet connection is determined from among the searched stations 2a. More practically, based on the station IDs from the search results, packet connection accommodating stations are searched for from the relation table stored in the memory 13. That is, the station IDs in association with information of "packetable" stations in the table are picked up from the relation table. The station IDs in the table are unique identifier for each of the base stations 2a. The station ID is also designated as a "station ID" in the claim language. If a packetable station is found (step S2, Yes), the flow proceeds to S3. If no packetable station is found (step S2, No), the flow proceeds to S4. Thus, the process in S2 is an equivalent of "a packetability check unit" in the claim language.

In step S3, the presentation unit 14 is used to display an in-area icon, which indicates that the mobile station 1 is within a service range of the packet connection, to proceed to S5. In step S4, the presentation unit 14 is used to display an out of service area icon, which indicates that the mobile station 1 is outside of a service range of the packet connection, to proceed to S5. The process in S3 is an equivalent of "a presentation unit" in the claim language.

Though, in the present embodiment, the control unit 12 is configured to control the presentation unit 14 to display the "packetability" icon (i.e., in-area/out of service area), the presentation unit 14 may be used to output a guidance sound to notify the "packetability" under control of the control unit 12. That is, an in-area message and an out of service area message may be vocally transmitted to the user.

It is then determined, in step S5, whether the base station 2a detected as connectable by the search has previously been connected. For example, when the station ID in the relation table in the memory 13 is associated with information of connection, the station 2a may be determined as previously connected. If it is determined that there are not-yet-connected stations 2a (step S5, Yes), the flow proceeds to S6. If it is determined that there is not not-yet-connected station 2a (step S5, No), the flow returns to S1. The process in S5 is an equivalent of "a history check unit" in the claim language.

In step S6, the communication unit 11 is controlled to perform a trial packet connection (i.e., a packet data communication) to the not-yet-connected base station 2a, to proceed to S7. The process in S6 is an equivalent of "a trial unit" in the claim language. The trial packet connection in S6 may be performed in the same manner as the well-known conventional packet connection.

Then, in step S7, it is determined whether the trial packet connection with the tried base station 2a has been successful. If the trail has been successful (step S7, Yes), the flow proceeds to step S8. If not (step S7, No), the flow proceeds to step S9.

In step S8, information of the "packetability" of the base station 2a is stored to the relation table in the memory 13 in association with the station ID, to return to step S2. In other words, in step S8, the station ID of the base station 2a is memorized in the memory 13 in association with the information that the base station 2a can accommodate the packet connection. Alternatively, in step S9, the station ID of the base station 2a is memorized in the memory 13 in association with the information that the base station 2a cannot accommodate the packet connection. The process in S8 and S9 is an equivalent of "a relation storage unit" in the claim language.

The flow in FIG. 3 is concluded when the ignition switch of the own vehicle is turned off to stop the power supply of the mobile station 1.

In the above flow, whether there is a packetable base station 2a is determined and displayed by the in-area/out of service area icon, after the station search that searches for a connectable station, and before the trial packet connection to the not-yet-connected station. However, (a) the trial packet connection to the not-yet-connected station may be performed and (b) the trial results (i.e., packetable or not) of the trial packet connection may be stored to the relation table in the memory 13 in association with the station ID of the tried station 2a, after the station search that searches for a connectable station, and before determining whether there is a packetable base station 2a and displaying the in-area/out of service area icon based on the determination results. That is, in other words, when there is a not-yet-connected base station 2a, the mobile station 1 may automatically perform the trial packet connection to that not-yet-connected base station 2a.

The above-described operation scheme can be summarized as follows. That is, when there is a not-yet-connected station 2a among the stations 2a that are identified as connectable, the control unit 12 of the mobile station 1 actually performs the trial packet connection to the station 2a to store, in the relation table in the memory 13, the trial result in association with the station ID of the tried station 2a. Further, the control unit 12 refers to the relation table based on the station ID of the connectable station 2a from the search, for the purpose of determining whether there is a packetable station 2a among the connectable stations 2a. Therefore, the packetable station 2a can be accurately determined from among the connectable stations. Furthermore, the packetability is displayed on the presentation unit 14 under control of the control unit 12 based on that accurately determined packetability, thereby enabling the user to recognize accurate packetability information. As a result, the user is prevented from being put into inconvenience due to the lack of recognition of packetability. In other words, the usability of the packet connection and user comfort are improved. The mobile station 1 is an equivalent of "a communication terminal" in the claim language.

Further, (a) when a request for packet connection from the user by an operation on an operation unit on the mobile station 1, or (b) when a request for packet connection is initiated by an application on the mobile station 1, the control unit 12 may perform, by using the communication unit 11, a packet connection to a selected base station 2a selected from among the connectable stations 2a after determining the connectable stations 2a that accommodate packet connection.

In this case, the packetable station 2a is determined, based on the station ID of the base station 2a determined as connectable by the search, by the control unit 12 with reference to the relation table stored in the memory 13, for finding the station ID that is associated with the information that indicates that the packet connection is possible. Therefore, the control unit 12 serves as "an identification unit" in the claim language. Further, the base station 2a to be connected is selected, for example, in a manner that prioritizes a connection to the station 2a that is operated by a subscribed operator of the mobile telephone network 2 than the station 2a that is operated by a non-subscribed operator (i.e., an operator having a roaming contract with the subscribed operator), if both of those kinds of stations 2a are available. Further, the station selection priority for selecting a station from among the connectable stations 2a is determined based on a communication environment index such as the signal intensity (i.e., the electrical field intensity) and Ec/Io. Therefore, the control unit 12 serves as "a selection unit" in the claim language.

The above operation scheme provides the following advantages. That is, if a subscribed operator's station 2a is found in the searched stations 2a, that station 2a is selected for the packet connection rather than connecting to the station 2a operated by the non-subscribed operator, thereby suppressing the packet connection through roaming service, which may provide lower grade of service. In other words, the mobile station 1 automatically selects an advantageous communication service in terms of connection charge and the like.

Further, because the communication environment such as the signal intensity and Ec/Io is prioritized next to the subscription to a certain operator, the packet connection is automatically stabilized in terms of selecting the best communication environment for the communication quality from among the available options.

Figure 4:
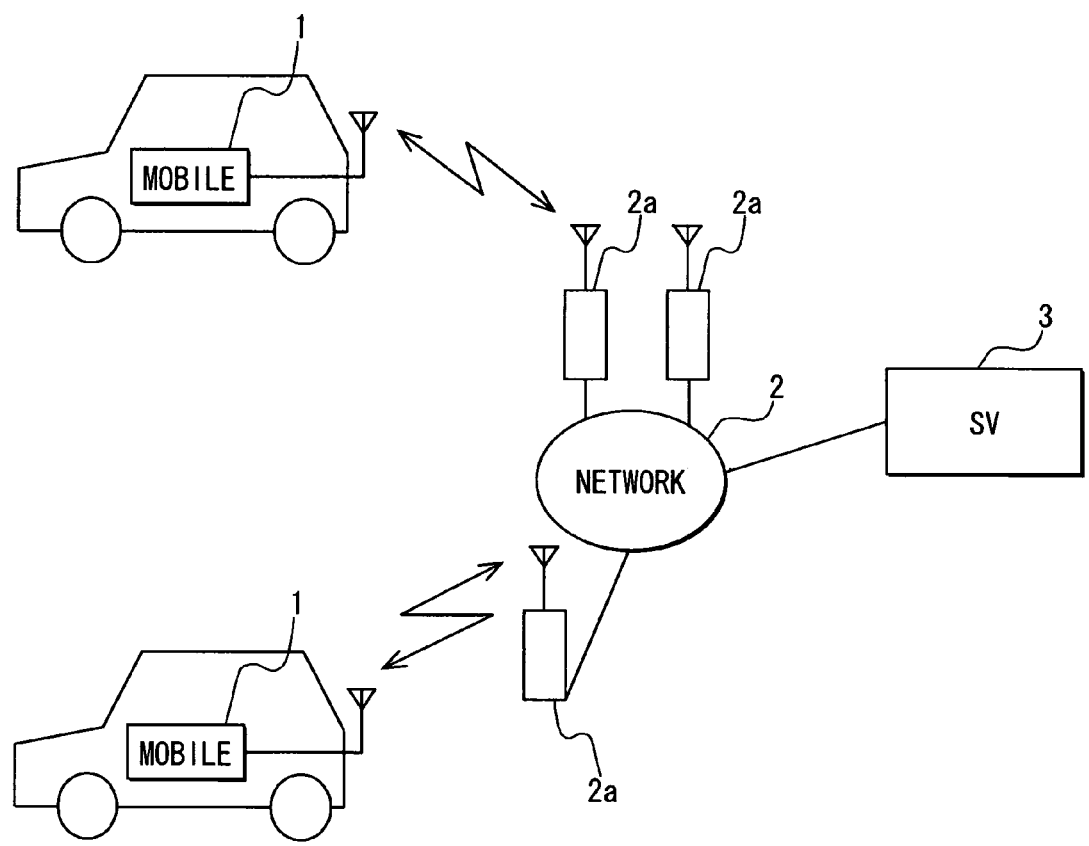
FIG. 4 is a block diagram of the communication system in another embodiment of the present disclosure.

Further, the information of the relation table held by each of the multiple mobile stations 1 may be collected and unified as collective information by the center server 3, and the collective information may be distributed for utilization by each of the multiple stations 1. A communication system 100a is illustrated in FIG. 4 as an example of the above-described information distribution scheme. FIG. 4 is a block diagram showing schematic configuration of the communication system 100a. In this case, like parts have like numbers, and the explanation of the like parts already provided for the communication system 100 is omitted from the following description.

The communication system 100a includes multiple mobile stations 1 as shown in FIG. 4. In addition, under the instruction of the control unit 12, the change in the relation table in the memory 13, that is, when a new relation between the station 2a and the station ID is stored in the relation table, the latest relation table information is uploaded to the center server 3, together with a mobile station ID of the mobile station 1 that uploads the information. The information upload from the mobile station 1 may be automatically performed, for example, at a timing of turning on of the ignition switch of the vehicle. In this case, the mobile station ID is a unique identifier of each of the mobile station 1.

The center server 3 unifies the uploaded (i.e., collected) information from the mobile stations 1, and puts the collective information of the relation table under control of a database in the center server 3. In the collective information stored in the database, the station ID of the base stations is used as a "main key" of the database. That is, in other words, the collective information is sorted by "the station ID" for reducing the redundancy of information in the relation table.

Then, the collective information is downloaded by the mobile station 1 from the database in the center server 3 under the instruction of the control unit 12, at a timing of, for example, turning on of the ignition key of the vehicle, to be stored in the relation table in the memory 13 of each of the mobile stations 1. The downloaded collective information is, for example, overwritten to update the existing information in the relation table in each of the mobile stations 1. The distributed information is then used in each of the mobile station 1 for determining the packetability of the connectable stations 2a. The center server 3 serves as "an information center" in the claim language.

In addition, though the communication system 100a is illustrated as including two mobile stations 1 in FIG. 4, the number of the mobile stations 1 may be more than three.

The above-described operation scheme enables the utilization of the information from the relation table of the other mobile stations 1 as the collective information, thereby enabling the reduction of the number of trial packet connections in each of the mobile stations 1. That is, in other words, the packetability information of the base stations 2a from other mobile stations 1 can be utilized for the improvement of process efficiency in each of the mobile stations 1.

In addition, the relation table storing the packetability of a station in association with the station ID may further store the information on the position of the mobile station 1 at the time of the trial packet connection as the associated information. In this case, the position of the mobile station may be determined by the control unit 12 based on the information of the communication area of the base station 2a (i.e., in which communication area of the base station 2a the mobile station 1 is currently located). In other words, the communication area information may be utilized for position determination of the mobile station 1. The control unit 12 may thus serve as "a positioning unit" in the claim language. The packetability of the searched base stations 2a may then determined based on the station IDs of the searched stations 2a (i.e., the connectable stations 2a) and the position of the mobile station 1 determined by the control unit 12, with reference to the relation table in the memory 13, for finding information of the packetability of the relevant base station 2a.

The above-described operation scheme enables the storage of the packetability of respective base stations 2a depending not only on the packet connection accommodation function of the respective stations 2a in addition to the roaming service accommodation for the packet connection, but also on the positions of the mobile stations 1 relative to each of the base stations 2a that cause the difference of the signal intensity and the like. Therefore, the packetable station 2a can be more accurately determined from among the connectable stations 2a, based on the position of the mobile station 1.

Further, the packetability information may be transmitted from the mobile station 1 to a cellular phone that is connected to a vehicular navigation system through Bluetooth wireless connection (a registered trademark), to provide the user with, the information visually or vocally from the display/speaker of the cellular phone.

In the present embodiment, the mobile station 1 is illustrated as a data communication module (DCM). However, the mobile station 1 may be any mobile communication device as long as the device can perform the packet connection with a base station of the mobile communication network. That is, for example, the cellular phone may serve as the mobile station 1. In case that the cellular phone is used as the mobile station 1, the flow in FIG. 3 may be started at a time of turning-on of the power supply of the cellular phone, and the flow may be concluded at a time of turning-off of the power supply of the cellular phone.

In addition, though the relation table is stored in the memory 13 the present embodiment, the relation table may be stored in the ROM, RAM and the like of the control unit 12.

Although the present disclosure has been fully described in connection with preferred embodiment thereof with reference to the accompanying drawings, it is to be noted that various changes and modifications will become apparent to those skilled in the art. Further, such changes, modifications, and summarized scheme are to be understood as being within the scope of the present disclosure as defined by appended claims.

What is claimed is:

1. A communication terminal for packet data communication with a base station that is connected to a mobile communication network, the communication terminal comprising:
   a search unit for searching for connectable base stations;
   a history check unit for examining if discovered base stations searched for by the search unit have been previously connected to;
   a trial unit for trying the packet data communication with not-yet-connected base stations when the not-yet-connected base stations are determined to be included in the discovered base stations by the history check unit;
   a relation storage unit for storing relationship information relating the result of a packet data communication trial by the trial unit with a base station ID of a base station subject to the packet data communication trial;

a packet data communication availability check unit for determining if a base station with which packet data communication is possible is among the discovered base stations based on the relationship information stored in the relation storage unit; and a presentation unit for presenting information regarding availability of packet data communication based on the determining by the packet data communication availability check unit.

2. The communication terminal of claim 1, wherein the history check unit determines a previously-connected base station to be a base station for which the base station ID corresponds to relationship information stored in the relation storage unit.

3. The communication terminal of claim 1 further comprising:

a positioning unit for determining a position of the communication terminal, wherein the relation storage unit stores the relationship information including the relationship information relating the result of a packet data communication trial by the trial unit, the base station ID of a base station subject to the packet data communication trial, and the position of the communication terminal at the time of the packet data communication trial.

4. The communication terminal of claim 3, wherein the positioning unit determines the position of the communication terminal based on a base station communication area in which the communication terminal is present.

5. The communication terminal of claim 1 further comprising:

an identification unit for identifying, based on the relationship information stored in the relation storage unit, base stations with which packet data communication is possible from among the discovered base stations searched for by the search unit; and a selection unit for selecting a connecting base station for performing the packet data communication from among the base stations identified by the identification unit.

6. The communication terminal of claim 5, wherein the selection unit selects the connecting base station, from among the base stations identified by the identification unit, according to a priority order that prioritizes base stations of a subscribed carrier of the communication terminal over base stations of a non-subscribed carrier, and a subsequent priority order that prioritizes base stations with a better communication environment.

7. A communication system comprising:

the communication terminal of claim 1; and a base station connected to the mobile communication network and capable of performing the packet data communication with the communication terminal via the mobile communication network.

8. The communication system of claim 7, wherein a plurality of the communication terminals are provided, an information center is provided for collecting and combining relationship information stored in the respective relation storage units of the plurality of communication terminals, and storing combined relationship information comprising the relationship information; and the combined relationship information stored in the information center is distributed to the communication terminals and stored as relation information in the respective relation storage units of the communication terminals.

9. The communication system of claim 7, wherein the communication terminal is a vehicular communication module used in a telematics communication.

10. The communication system of claim 7, wherein the communication terminal is a cellular phone.

* * * * *